(12) United States Patent
Kato

(10) Patent No.: US 11,297,303 B2
(45) Date of Patent: Apr. 5, 2022

(54) CONTROL APPARATUS, CONTROL METHOD, AND STORAGE MEDIUM

(71) Applicant: CANON KABUSHIKI KAISHA, Tokyo (JP)

(72) Inventor: Yuji Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 160 days.

(21) Appl. No.: 16/745,170

(22) Filed: Jan. 16, 2020

(65) Prior Publication Data
US 2020/0236346 A1    Jul. 23, 2020

(30) Foreign Application Priority Data

Jan. 21, 2019 (JP) .............................. JP2019-007940

(51) Int. Cl.
*H04N 13/349* (2018.01)
*H04N 13/282* (2018.01)
*G06F 3/04815* (2022.01)
*G06F 3/01* (2006.01)

(52) U.S. Cl.
CPC .......... *H04N 13/349* (2018.05); *G06F 3/017* (2013.01); *G06F 3/04815* (2013.01); *H04N 13/282* (2018.05); *G06F 2203/04808* (2013.01)

(58) Field of Classification Search
CPC .... H04N 13/349; H04N 13/282; G06F 3/017; G06F 3/04815; G06F 2203/04808
See application file for complete search history.

(56) References Cited

U.S. PATENT DOCUMENTS

| | | | | |
|---|---|---|---|---|
| 8,717,360 B2* | 5/2014 | Vesely | .................. | H04N 13/366 345/427 |
| 2011/0304617 A1* | 12/2011 | Nishida | ............... | A63F 13/5258 345/419 |
| 2013/0321402 A1* | 12/2013 | Moore | .................. | G01C 21/367 345/419 |
| 2013/0325343 A1* | 12/2013 | Blumenberg | ....... | G06F 3/04815 701/533 |
| 2013/0326407 A1* | 12/2013 | van Os | .............. | G01C 21/3664 715/810 |

(Continued)

FOREIGN PATENT DOCUMENTS

JP         2015187797 A    10/2015

*Primary Examiner* — Maria E Vazquez Colon
(74) *Attorney, Agent, or Firm* — Canon U.S.A., Inc. IP Division

(57) ABSTRACT

A control apparatus includes a display control unit configured to display a virtual viewpoint image on a display unit, an identification unit configured to identify a selected reproduction mode from among a plurality of reproduction modes including a first reproduction mode in which a position of a virtual viewpoint corresponding to the virtual viewpoint image displayed on the display unit is determined regardless of a position of an object in an image-capturing region, and a second reproduction mode in which the position of the virtual viewpoint changes in accordance with the position of the object in the image-capturing region, and a control unit configured to change at least either one of a position and an orientation of the virtual viewpoint in response to a user operation. The change to be made in response to an identical user operation differs between the first reproduction mode and the second reproduction mode.

16 Claims, 9 Drawing Sheets

(56) References Cited

U.S. PATENT DOCUMENTS

| | | | | |
|---|---|---|---|---|
| 2014/0066195 | A1* | 3/2014 | Matsui | A63F 13/06 |
| | | | | 463/30 |
| 2016/0212384 | A1* | 7/2016 | Sawada | G06T 19/003 |
| 2017/0249784 | A1* | 8/2017 | Ohnishi | G06T 19/003 |
| 2019/0262700 | A1* | 8/2019 | Nakamura | G06F 3/04886 |
| 2020/0234495 | A1* | 7/2020 | Nakao | H04N 21/6587 |

* cited by examiner

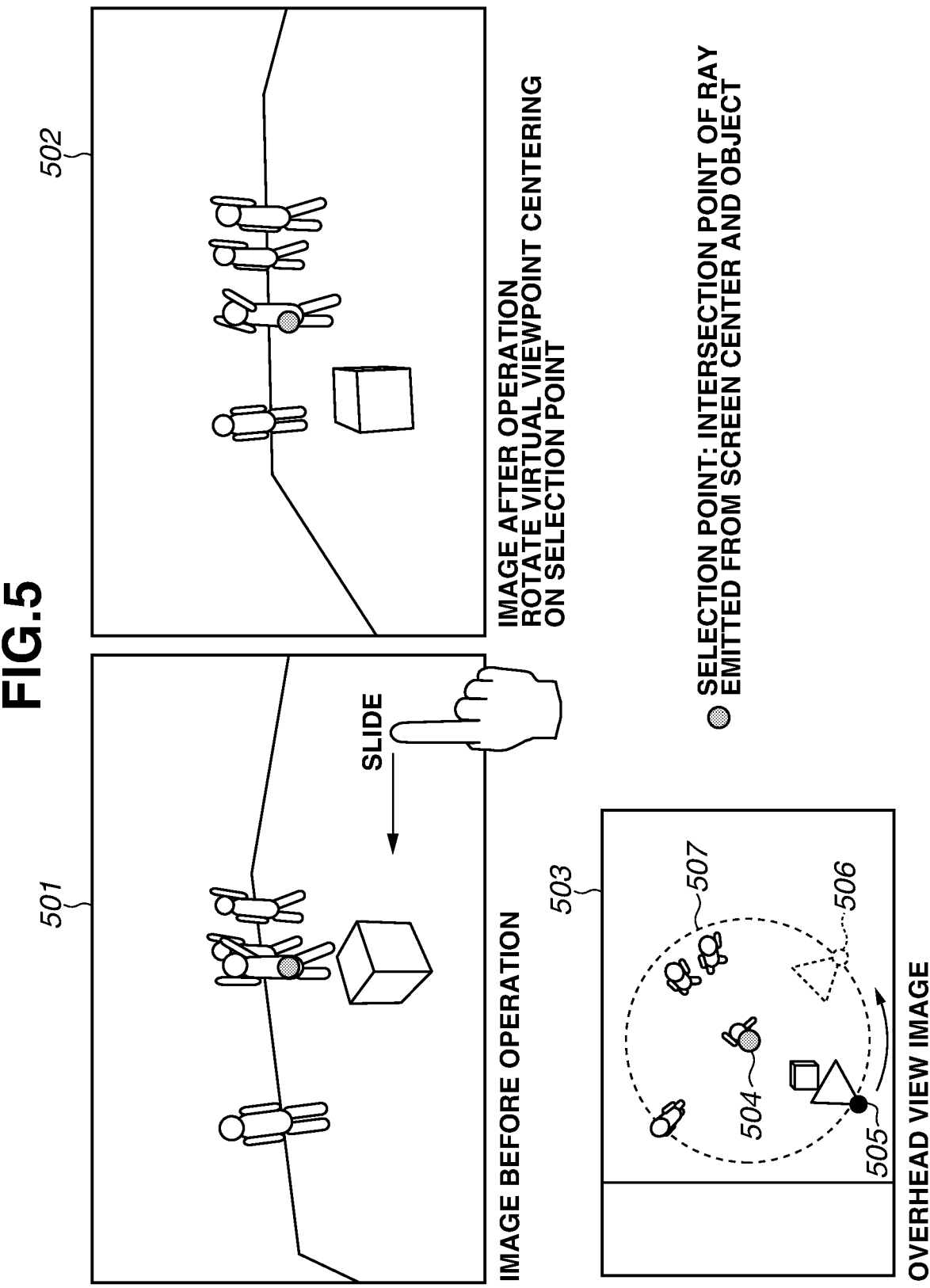

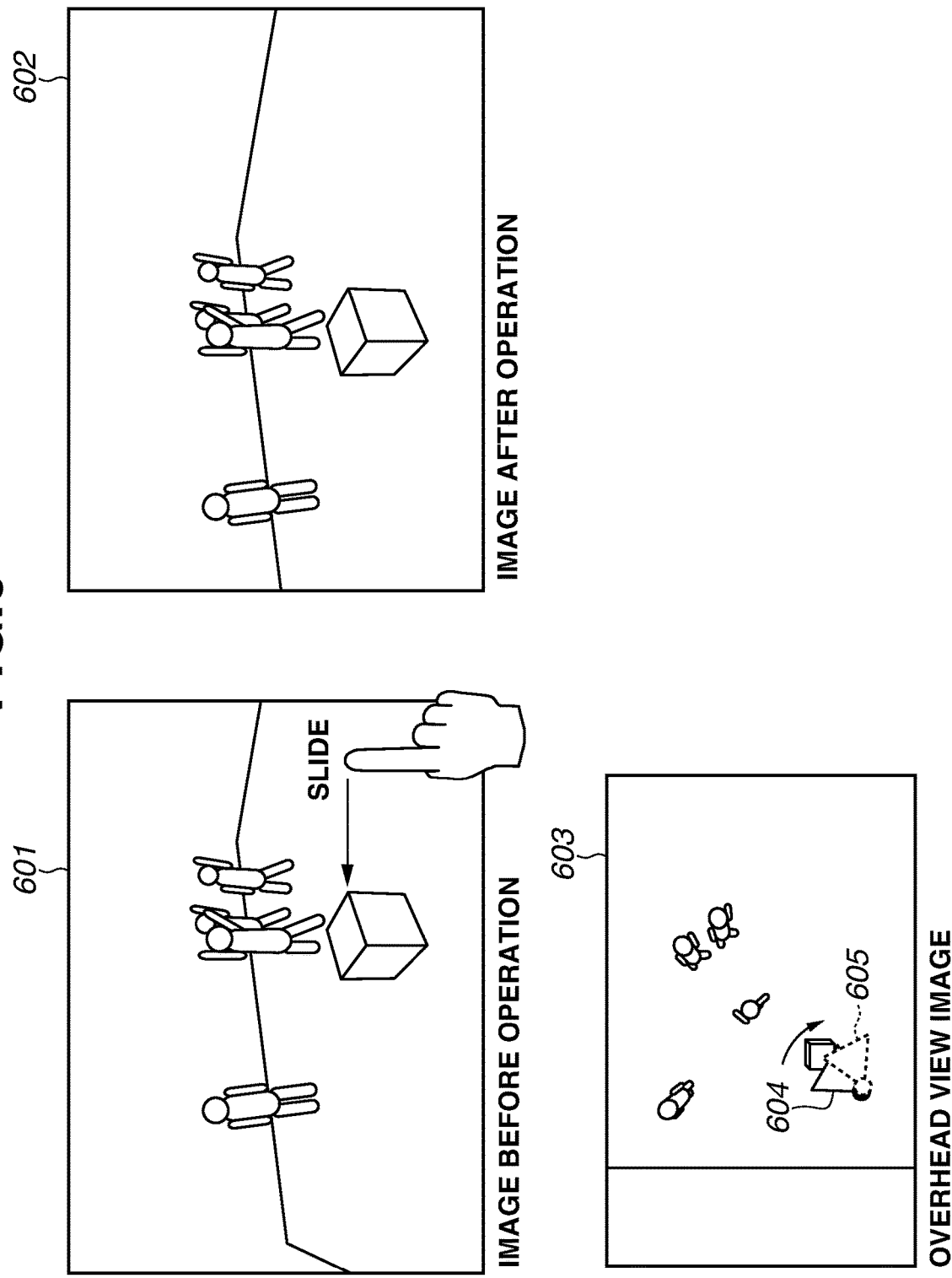

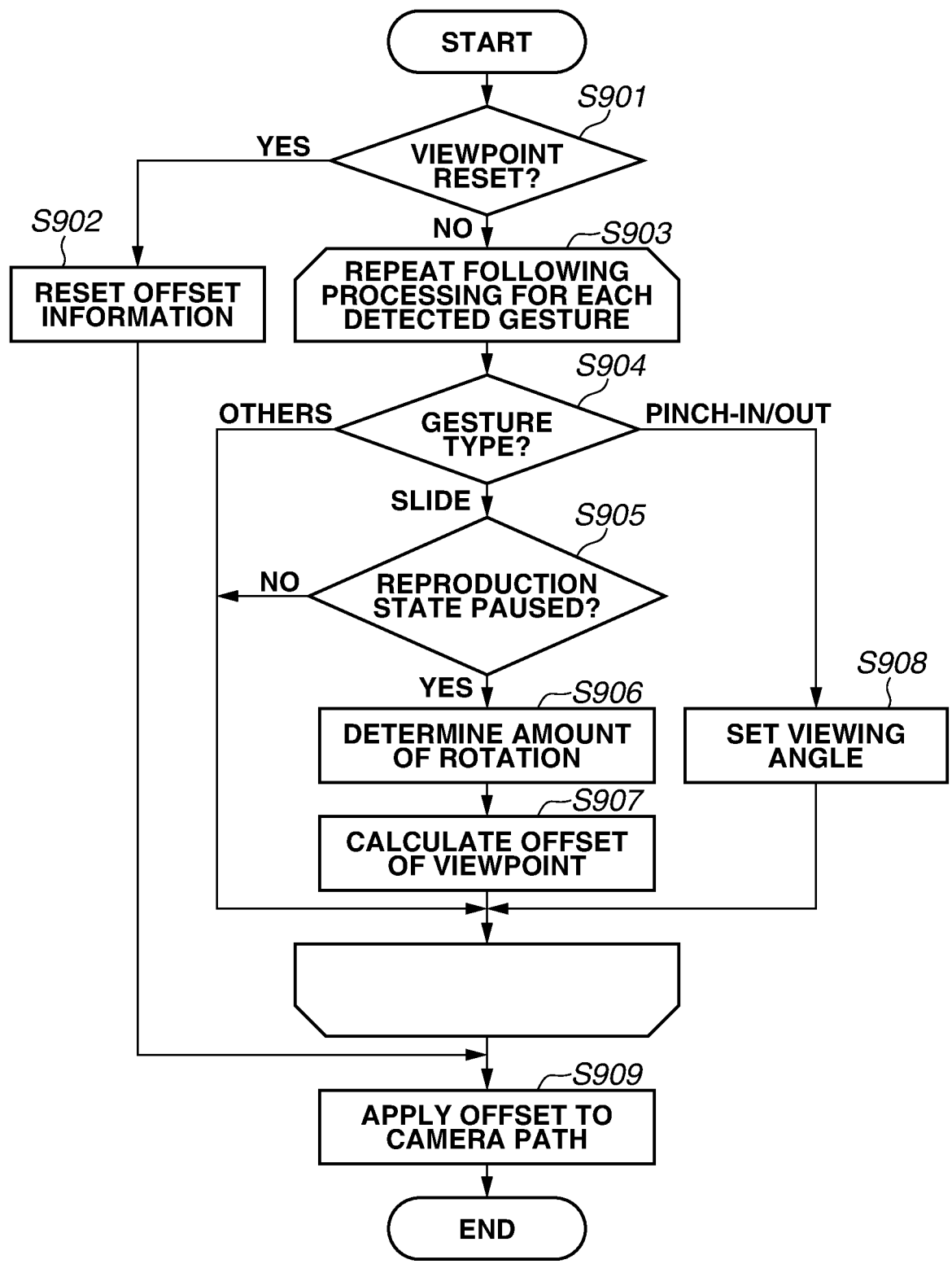

CONTROL APPARATUS, CONTROL METHOD, AND STORAGE MEDIUM

BACKGROUND OF THE INVENTION

Field of the Invention

The present invention relates to a technique for controlling a virtual viewpoint related to a virtual viewpoint image.

Description of the Related Art

Among techniques for generating a virtual viewpoint image, generating an image of a viewpoint based on a plurality of captured images acquired by using a plurality of cameras having different viewpoints are known. Examples of the known methods for generating a virtual viewpoint image include a method in which a virtual viewpoint image is prepared based on a moving path (camera path) of a predetermined virtual viewpoint, and a method for generating a virtual viewpoint image in accordance with a position and an orientation of a virtual viewpoint specified by a viewer.

Using techniques for generating a virtual viewpoint image, image viewing with high interactivity can be achieved. Meanwhile, since a high degree of freedom is allowed in virtual viewpoint operations, inexperienced users have difficulty in operating a viewpoint as intended. Japanese Patent Application Laid-Open No. 2015-187797 discusses a technique in which a user selects one of a plurality of pieces of viewpoint coordinate data and one of a plurality of pieces of rotation start point data, and inputs a rotational angle and an amount of movement of the viewpoint to set a viewpoint.

SUMMARY OF THE INVENTION

According to an aspect of the present disclosure, a control apparatus includes a display control unit configured to display a virtual viewpoint image on a display unit, the virtual viewpoint image being generated based on a plurality of images acquired by capturing images of an image-capturing region from different directions by using a plurality of imaging apparatuses, an identification unit configured to identify a selected reproduction mode from among a plurality of reproduction modes including a first reproduction mode in which a position of a virtual viewpoint corresponding to the virtual viewpoint image displayed on the display unit is determined regardless of a position of an object in the image-capturing region, and a second reproduction mode in which the position of the virtual viewpoint changes in accordance with the position of the object in the image-capturing region, and a control unit configured to change at least either one of a position and an orientation of the virtual viewpoint in response to a user operation, wherein the change to be made in response to an identical user operation differs between a case where the reproduction mode identified by the identification unit is the first reproduction mode and a case where the identified reproduction mode is the second reproduction mode.

Further features of the present disclosure will become apparent from the following description of exemplary embodiments with reference to the attached drawings.

BRIEF DESCRIPTION OF THE DRAWINGS

FIG. 5 is a diagram illustrating an example of a virtual viewpoint operation in a free operation mode.

FIG. 6 is a diagram illustrating an example a virtual viewpoint operation in a player's viewpoint mode.

FIG. 9 is a flowchart illustrating an example of processing related to virtual viewpoint control in the player's viewpoint mode.

DESCRIPTION OF THE EMBODIMENTS

Figure 1:
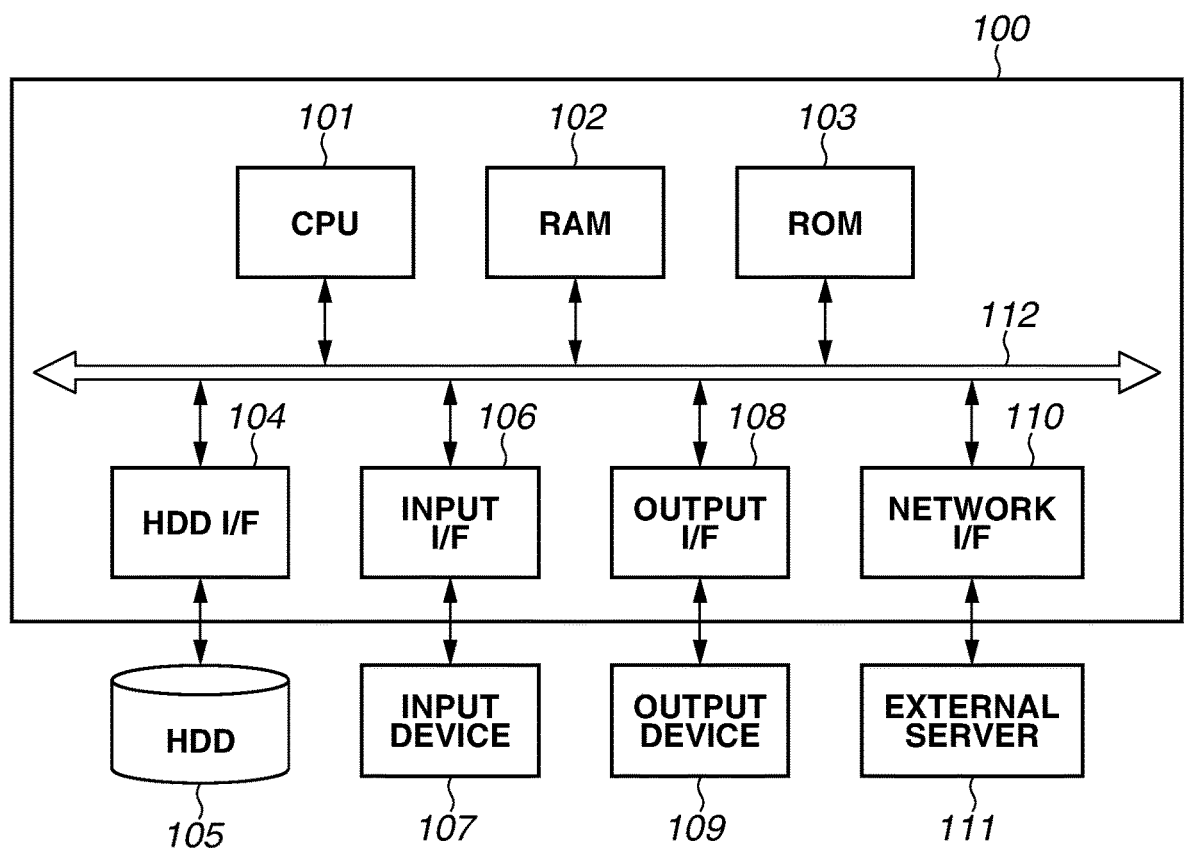
FIG. 1 is a block diagram illustrating a hardware configuration of a display control apparatus.

An exemplary embodiment of the present disclosure will be described below with reference to the accompanying drawings. The following exemplary embodiment does not limit the present disclosure. Not all of the combinations of the features described in the exemplary embodiment are indispensable to the solutions for the present disclosure. Elements having an identical configuration are assigned the same reference numerals.

<System Configuration>

According to the present exemplary embodiment, a display control apparatus 100 (hereinafter referred to as a control apparatus 100) generates a virtual viewpoint image and displays the image on a display unit. A virtual viewpoint image refers to an image generated based on a plurality of captured images (a plurality of viewpoint images) acquired by a plurality of imaging apparatuses (cameras) for capturing images of a field (imaging target region) from different directions, and to an image generated according to the position and the orientation of a specified virtual viewpoint. Although the present exemplary embodiment will be described below centering on a case where a moving image is used as a virtual viewpoint image, a still image may also be used as a virtual viewpoint image to be processed by the control apparatus 100. A virtual viewpoint image of a moving image may be image data in which each image frame is compressed by using a predetermined moving image compression method, image data in which each image frame is compressed by a predetermined still image compression method, or non-compressed image data.

According to the present exemplary embodiment, "changing the position of a virtual camera" is also represented as "changing the position of a virtual viewpoint", and "changing the orientation of a virtual viewpoint" is also represented as "changing the orientation of a virtual camera". A virtual camera according to the present exemplary embodiment indicates a virtual camera which is different from a plurality of imaging apparatuses actually installed around the imaging target region. More specifically, a virtual camera refers to a concept for conveniently describing a virtual viewpoint related to the generation of a virtual viewpoint image. More specifically, a virtual viewpoint image generated by the control apparatus 100 can be considered as an image captured from a virtual viewpoint set in a virtual space related to the imaging target region. The position and the orientation of the viewpoint in the image capturing can be represented as the position and the orientation of the virtual camera. In other words, when presuming that a camera exists at the position of a virtual viewpoint set in a space, a virtual viewpoint image generated by the control apparatus 100 is an image simulating a captured image acquired by the camera. However, it is not essential to use the concept of a virtual camera to implement the configuration of the present exemplary embodiment. In the present exemplary embodiment, at least information indicating a position in a space and information indicating an orientation in the space are set and that a virtual viewpoint image is generated according to the set information. The virtual viewpoint image according to the present exemplary embodiment is also referred to as a free viewpoint image, and is not limited to an image corresponding to a viewpoint freely (arbitrarily) specified by a user. For example, an image corresponding to a viewpoint selected by the user from a plurality of candidates is also included in a virtual viewpoint image.

An example of a system configuration of the control apparatus 100 according to the present exemplary embodiment will be descried below with reference to FIG. 1. Referring to FIG. 1, a central processing unit (CPU) 101 executes a program stored in a read only memory (ROM) 103 and/or a hard disk drive (HDD) 105 by using a random access memory (RAM) 102 as a work memory to control each configuration (described below) via a system bus 112. Thus, various processing (described below) is executed. An HDD interface (I/F) 104 is, for example, a serial ATA (SATA) interface for connecting the control apparatus 100 with the HDD 105 and a secondary storage device such as an optical disk drive. The CPU 101 can write and read data to/from the HDD 105 via the HDD I/F 104. The CPU 101 also loads data stored in the HDD 105 into the RAM 102.

Also, the CPU 101 can store in the HDD 105 various types of data in the RAM 102 obtained by program execution. An input I/F 106 connects an input device 107, such as a touch panel for inputting one or a plurality of coordinates, keyboard, mouse, digital camera, and scanner, with the control apparatus 100. The input I/F 106 is, for example, a serial bus interface such as Universal Serial Bus (USB) and Institute of Electrical and Electronics Engineers (IEEE) 1394. The CPU 101 can read data from the input device 107 via the input I/F 106. An output I/F 108 connects an output device 109 such as a display with the control apparatus 100. An example of the output I/F 108 is an image output interface such as Digital Visual Interface (DVI) and High-Definition Multimedia Interface (HDMI) (registered trademark). The CPU 101 transmits data related to a virtual viewpoint image to the output device 109 via the output I/F 108 to display the virtual viewpoint image. A network I/F 110 connects the control apparatus 100 with an external server 111. An example of the network I/F 110 is a network card such as a local area network (LAN) card. The CPU 101 can read various types of data related to the generation of a virtual viewpoint image from the external server 111 via the network I/F 110.

The present exemplary embodiment will be described below centering on an example where the input device 107 is a touch panel of the control apparatus 100. More specifically, the control apparatus 100 may also be a smart phone or a tablet terminal. In this case, the input device 107 (touch panel) and the output device 109 (display screen) are integrally configured with the control apparatus 100. Not all of the configurations illustrated in FIG. 1 are essential configurations. For example, when the control apparatus 100 reproduces a virtual viewpoint image stored in the HDD 105, the external server 111 can be omitted. Meanwhile, when the control apparatus 100 generates a virtual viewpoint image acquired from the external server 111, the HDD 105 can be omitted. In addition, the control apparatus 100 may include a plurality of CPUs 101. In addition to the CPU 101, the control apparatus 100 may include at least one or a plurality of dedicated hardware components and a Graphics Processing Unit (GPU). At least part of processing by the CPU 101 may be executed by the GPU or dedicated hardware. Examples of dedicated hardware include an Application Specific Integrated Circuit (ASIC), a Field Programmable Gate Array (FPGA), and a Digital Signal Processor (DSP).

The present exemplary embodiment will be described below centering on a method for controlling a virtual camera according to the user's intention by changing a viewpoint control method depending on a currently set reproduction mode among a plurality of predetermined reproduction modes (display modes) for reproducing and displaying a virtual viewpoint image. User operations according to the present exemplary embodiment include a tap operation, a slide operation with one finger, a slide operation with two fingers, a pinch-in operation, and a pinch-out operation. A tap operation refers to an operation by a finger or specified tool touching the touch panel within a predetermined time period starting from when a finger or a specified tool touches the touch panel to when the touching finger or specified tool is moved off from the touch panel. A slide operation refers to an operation by a finger or specified tool moving for a predetermined distance or longer while the finger or specified tool are kept in contact with the touch panel. Touching a plurality of positions (e.g., two positions) on the touch panel simultaneously and bring the touched positions closer to each other is referred to as a pinch-in operation. An operation to move the touched positions away from each other is referred to as a pinch-out operation. However, the details of user operations are not limited thereto.

According to the present exemplary embodiment, a virtual viewpoint image is to be generated based on a captured image of a soccer game. The present exemplary embodiment will be described below using a case in which, as viewpoint information (camera path) representing the position and the orientation of a virtual viewpoint, a camera path along virtual viewpoints corresponding to a position and an orientation of a player's face in the image-capturing region of each of a plurality of viewpoint images is used. The position of the virtual viewpoint indicated by the camera path may coincide with the player's position or is a position at a predetermined distance from the player (e.g., a position behind the player). The orientation of the virtual viewpoint indicated by the camera path may coincide with the orientation of the player's face or correspond to the orientation of the body, feet, or eyes of the player. A camera path may be automatically generated by analyzing the motion of the player, or manually generated. Applicable camera paths include not only a camera path corresponding to the position and the orientation of a player's face but also camera paths corresponding to any objects such as camera paths corresponding to the position of a referee or other person and the position of the ball. Imaging targets are not limited to soccer games and may include games of rugby and other sports and concerts on stage.

A relation between a specific reproduction mode, a user operation, and the operation of a virtual camera will be described below with reference to FIGS. 4A, 4B, 5, and 6. According to the present exemplary embodiment, there are two different modes for reproducing a virtual viewpoint image: a free operation mode and a player's viewpoint mode. The control apparatus 100 reproduces a virtual viewpoint image while switching between these modes in response to a user operation. The free operation mode is a mode in which the position and the orientation of a virtual viewpoint are directly specified by a user operation. The player's viewpoint mode is a mode in which adjustment amounts (offsets) of the position and the orientation of a virtual viewpoint from a reference camera path corresponding to the position and the orientation of a player's face are specified by a user operation. More specifically, in the free operation mode, the position and the orientation of a virtual viewpoint are determined regardless of the position and the orientation of the player in the image capturing region. In the player's viewpoint mode, the position and the orientation of the virtual viewpoint vary according to the position and the orientation of the player in the image capturing region. An example of adding offsets to a reference camera path will be described with reference to FIGS. 4A and 4B.

Figure 4A:
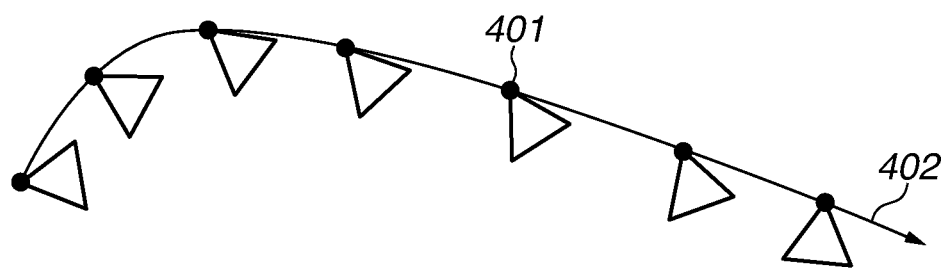
FIGS. 4A and 4B are diagrams each illustrating offsets of a camera path.
Figure 4B:
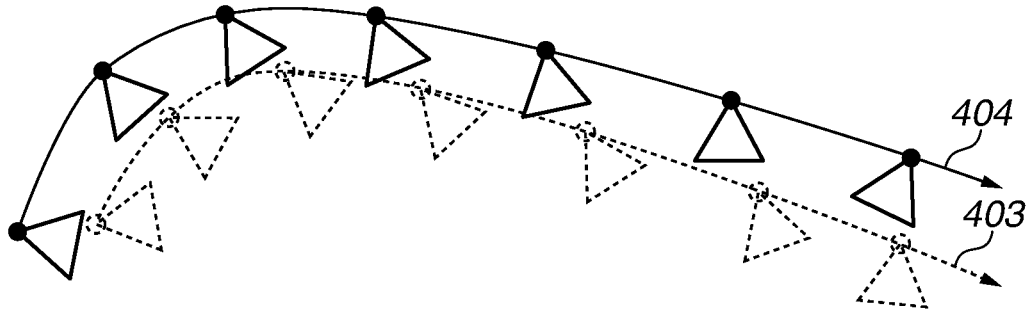

FIG. 4A illustrates an example of a reference camera path. The black dot of a viewpoint 401 indicates the position of a virtual viewpoint (the position corresponding to a player's face), and a triangle indicates the orientation of the virtual viewpoint (the orientation corresponding to the player's face). The direction from the vertex of the triangle overlapping with the black dot to the middle point of the opposite side of the triangle indicates the line-of-sight direction of the viewpoint 401. FIG. 4A illustrates a state where the position and the orientation of a virtual camera change in time series along the arrow of a camera path 402. FIG. 4B illustrates an example of a case where the position of each virtual viewpoint is rearwardly moved and the orientation of each virtual viewpoint is rotated clockwise with respect to the reference camera path illustrated in FIG. 4A.

Referring to FIG. 4B, a camera path 403 drawn by a dotted line indicates the same reference camera path as the camera path 402, while a camera path 404 indicates the camera path 402 after the offset addition. The position of each virtual viewpoint on the camera path 404 after addition of the offset is rearwardly moved in the original line-of-sight direction, and the orientation of each virtual viewpoint is rotated clockwise by about 15 degrees. In this way, offsets are added to the position and the orientation in the local coordinate system of the virtual viewpoint, based on the position and the orientation of the virtual viewpoint at each time on the input camera path. With this configuration, the position and the orientation of a virtual viewpoint can be freely adjusted while maintaining features such as the way the virtual viewpoint changes on the original camera path. In the player's viewpoint mode according to the present exemplary embodiment, offsets to the camera path predetermined according to the position and the orientation of a player are specified by a user operation, and the virtual viewpoint moves at the position away from the moving path of the player by the distance corresponding to a specified offset. The orientation of the virtual viewpoint is deviated from the orientation of the player by the angle corresponding to a specified offset. With this configuration, the user can easily operates the virtual viewpoint while the intention of the camera path representing positions and the orientations of a predetermined viewpoint.

A method for changing a virtual viewpoint according to a user operation in the free viewpoint and the player's viewpoint modes will be described below with reference to FIGS. 5 and 6. FIG. 5 illustrates a state where the position and the orientation of a virtual camera change by a rotation operation in the free viewpoint mode. When the user performs a one-finger slide operation for sliding the coordinates to the left on the screen (touch panel) displaying an image 501 which is before accepting a user operation, the position and the orientation of the virtual camera are changed, and an image 502 is displayed. In this case, the position and the orientation of the virtual camera change to those for a virtual viewpoint 506 as a result of the rightward movement of a virtual viewpoint 505 centering on a selection point 504 on the three-dimensional space drawn at the center of an overhead image 503. More specifically, when the number of coordinates on the display screen (display surface) specified at the same time by a user operation is one, the virtual camera rotates centering on predetermined target coordinates (selection point 504) according to the movement of the specified coordinates. In other words, when the number of coordinates on the display surface specified at the same time by a user operation is one, the virtual camera rotates while being oriented to a predetermined reference position according to the movement of the specified coordinates. More specifically, when a one-finger slide operation is detected, the virtual camera moves within the range of a sphere 507 centering on the selection point 504. This enables simply generating a virtual viewpoint image such as a bullet time.

According to the present exemplary embodiment, the selection point 504 is determined based on the position and the orientation of the virtual camera and the position of an object in the image-capturing region. More specifically, the intersection of the optical axis of the virtual camera and an object such as a player and the ground (the intersection of a ray virtually emitted in the depth direction of the center of the image 501 and the object) is used as the selection point 504. However, the selection point 504 as the center of rotation of the virtual camera is not limited thereto. For example, three-dimensional coordinates of the selection point 504 may be specified by the user.

FIG. 6 illustrates a state where the orientation of the virtual camera changes by a rotation operation in the player's viewpoint mode. The position and the orientation of a virtual viewpoint 604 correspond to the position and the orientation of the player's face, respectively. An image 601 is a virtual viewpoint image reproducing the player's view. When the user performs a one-finger slide operation to the left on the screen displaying the image 601 which is before accepting a user operation, the orientation of the virtual camera is changed, and an image 602 is displayed. In this case, the position of the virtual camera remains unchanged and, as a result of the clockwise rotation of the virtual viewpoint 604 centering on the virtual camera, the orientation of the virtual camera changes from that for the virtual viewpoint 604 to that for a virtual viewpoint 605. More specifically, the virtual camera rotates at the same position in response to the movement of the specified coordinates by a slide operation by the user. This makes it possible to generate such a virtual viewpoint image that the player as a reference virtual viewpoint looks around. This also enables the user to confirm the surrounding status viewed from the viewpoint position of the player as a reference virtual viewpoint.

In the player's viewpoint mode, parameters related to the zoom value of the virtual camera are changed by a pinch-in and a pinch-out operation. The wider the fingers are opened, the larger the zoom value (the smaller the viewing angle) and the larger the display of a subject (e.g., objects such as players) within the view of the virtual camera. The closer the fingers are closed, the smaller the zoom value (the larger the viewing angle) and the smaller the display of a subject (e.g., objects such as players) within the view of the virtual camera. This means that the user can perform intuitive operations. By the operation, the user can check how much other players and objects exist within the view depending on the field width of the player as a reference virtual viewpoint. In the player's viewpoint mode, the position of the virtual camera may be changed not only by changing the orientation and the zoom value of the virtual camera but also by another user operation. For example, which of the orientation or the position of the virtual camera is to be changed may be determined by the number of fingers to be used to perform a slide operation. <Processing Flow of Control Apparatus>

Figure 2:
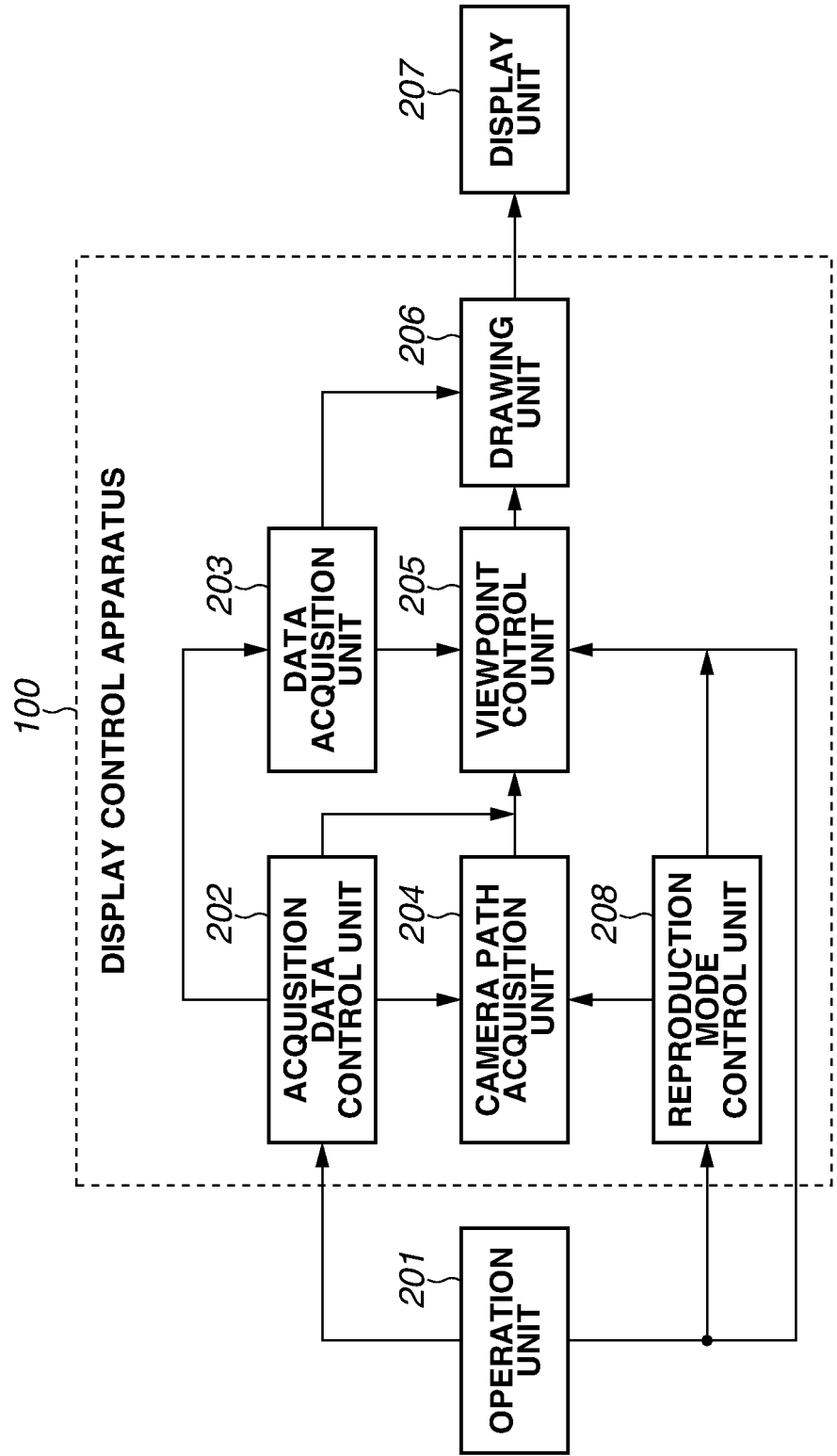
FIG. 2 is a block diagram illustrating a functional configuration of the display control apparatus.

A flow of processing performed by the control apparatus 100 according to the present exemplary embodiment will be described below with reference to FIGS. 2 and 7. FIG. 2 is a block diagram illustrating a functional configuration of the control apparatus 100 according to the present exemplary embodiment. When the CPU 101 illustrated in FIG. 1 reads a program stored in the ROM 103 and/or the HDD 105 and executes the program by using the RAM 102 as a work area, the CPU 101 plays the role of each function block in the control apparatus 100 illustrated in FIG. 2. An operation unit 201 and a display unit 207 illustrated in FIG. 2 correspond to the input device 107 and the output device 109, respectively, illustrated in FIG. 1. The CPU 101 does not need to play the roles of all function blocks in the control apparatus 100, and a dedicated processing circuit corresponding to each function block may be provided. FIG. 2 illustrates an example case where the operation unit 201 and the display unit 207 are provided outside the control apparatus 100. However, at least either one of the operation unit 201 and the display unit 207 may be configured inside the control apparatus 100.

Figure 7:
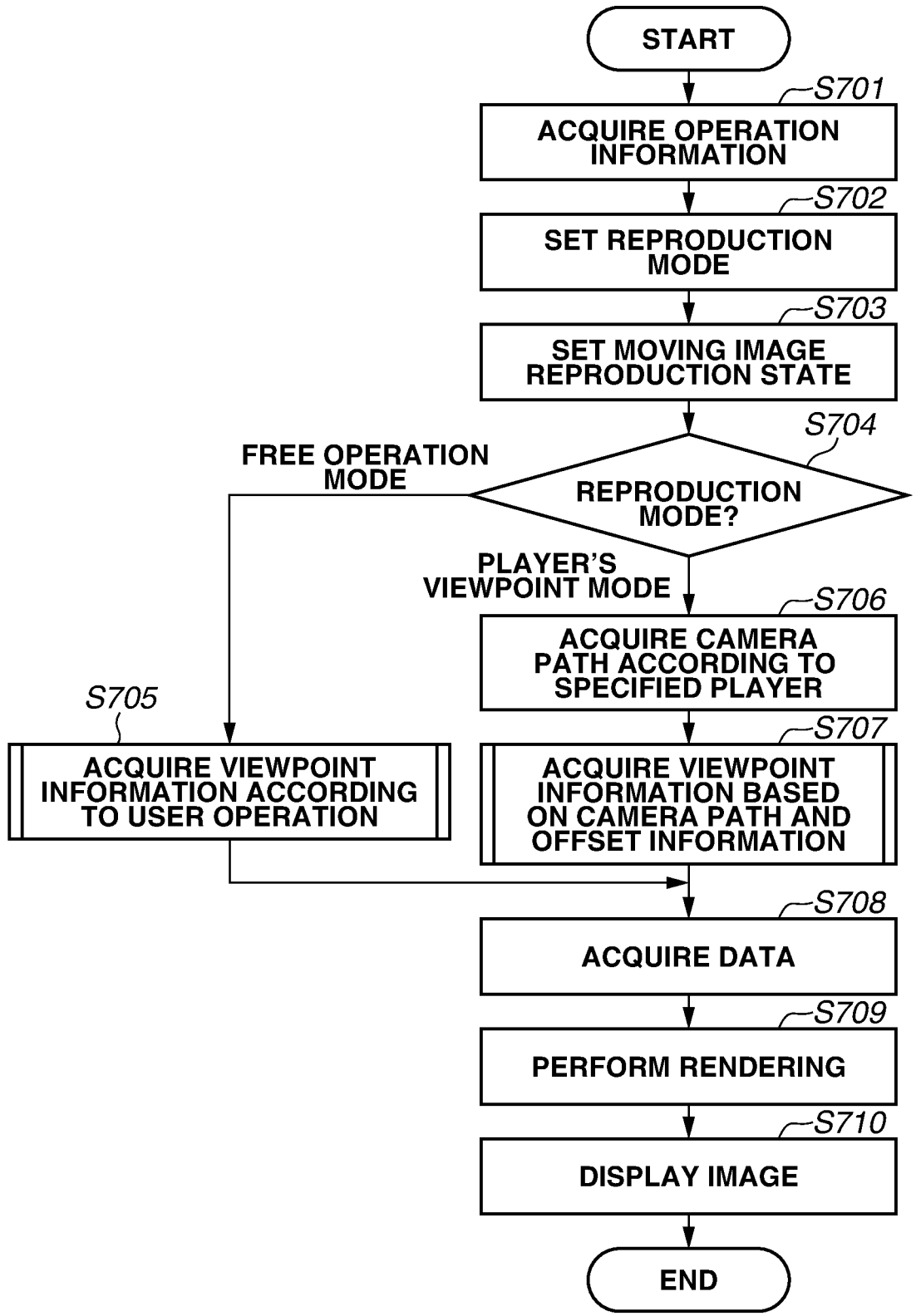
FIG. 7 is a flowchart illustrating an example of an operation of the display control apparatus.

FIG. 7 is a flowchart illustrating processing procedure which is performed by the control apparatus 100 according to the present exemplary embodiment. Each piece of processing (described below with reference to FIG. 7) is implemented when the CPU 101 included in the control apparatus 100 reads a program stored in the ROM 103 and/or the HDD 105 and executes the program by using the RAM 102 as a work area. The processing illustrated in FIG. 7 is started at the timing when a user operation is performed via the operation unit 201 during the reproduction of a virtual viewpoint image on a display unit 207. The reproduction of a virtual viewpoint image on the display unit 207 is performed, for example, when an image reproduction application implemented in the control apparatus 100 is activated, a moving image to be reproduced is specified using the application, and then a reproduction start instruction is issued. After the reproduction is started, a virtual viewpoint image corresponding to a predetermined virtual viewpoint or an automatically determined virtual viewpoint is displayed until a user operation for setting the reproduction mode or a user operation for controlling a virtual viewpoint is performed. The start timing of the processing illustrated in FIG. 7 is not limited thereto.

In step S701, the acquisition data control unit 202, the reproduction mode control unit 208, and a viewpoint control unit 205 start acquisition of operation information corresponding to a user operation detected on the operation unit 201. The operation unit 201 is a touch panel, and user operations on the operation unit 201 includes a tap operation, a double tap operation, a slide operation, a pinch-in operation, and a pinch-out operation. Operation information acquired in response to a user operation indicates the number of fingers in contact with the screen and the coordinates of each finger, a coordinate x' of a representative point specified by the finger in contact with the screen, a two-dimensional vector $d=(d_x, d_y)$ representing the variation of the coordinates of the representative point, and a vector T representing the position of a three-dimensional point. However, not all of the above-described information needs to be included in the operation information. The operation information may include information indicating the variation of the distance between two fingers in contact with the screen.

In the coordinate system of the two-dimensional screen representing the touch position of a finger, the origin is at the upper left corner, the rightward direction is the +x direction, and the downward direction is the +y direction. A representative point is at the coordinates of the center of gravity of the two-dimensional screen coordinate xi of a plurality of points included in a range where a finger is in contact with the screen. However, the representative point is not limited to the center of gravity, and may be average coordinates of the two-dimensional screen coordinate xi, a randomly selected one point out of a plurality of two-dimensional screen coordinates xi, or a point where the finger is in contact for the longest period of time. When only one point is touched, the point may be handled as a representative point.

A three-dimensional point refers to a point in a three-dimensional space identified based on the position and the orientation of the virtual camera, that is for example, a point where a ray virtually emitted from a start point having the three-dimensional coordinates corresponding to the position of the virtual camera reaches a subject (ray cast). This three-dimensional point is target coordinates to be used as a base point of rotation and a reference point of movement in virtual camera operations. Although, in an example according to the present exemplary embodiment, a three-dimensional point is represented by a vector T, the form of the three-dimensional point is not limited to a vector form.

Upon start of the acquisition of the operation information in step S701, the acquisition data control unit 202, the reproduction mode control unit 208, and the viewpoint control unit 205 acquire new operation information at predetermined time intervals (e.g., at each frame time of the virtual viewpoint image to be displayed). While no operation is performed on the operation unit 201, no operation information may be acquired or the operation information indicating no operation may be acquired. The acquired operation information is used to set the reproduction mode in step S702 (described below), set the reproduction state in step S703, and control the virtual camera in steps S705 and S707.

Figure 3:
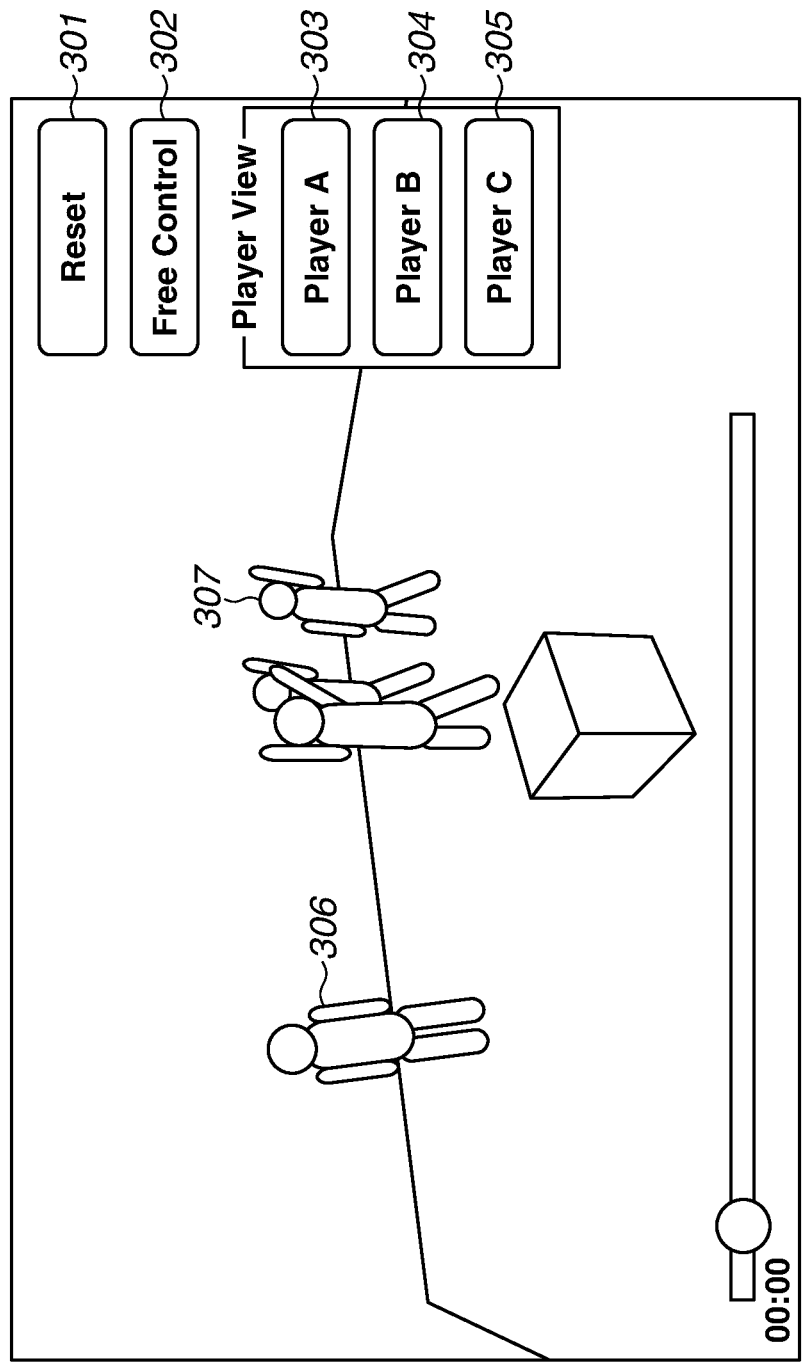
FIG. 3 is a diagram illustrating an example of an operation screen displayed by the display control apparatus.

In step S702, the reproduction mode control unit 208 identifies one reproduction mode from among a plurality of predetermined reproduction modes based on the acquired operation information, and outputs information indicating the reproduction mode identified by the camera path acquisition unit 204 and the viewpoint control unit 205. When the reproduction mode is the player's viewpoint mode, the reproduction mode control unit 208 also outputs player identification information for the player as a reference virtual viewpoint. A method for determining the reproduction mode will be described below with reference to FIG. 3. FIG. 3 illustrates an example of an image displayed on the display unit 207, and the control apparatus 100 perform processing in response to a user operation on the touch panel (operation unit 201) displaying this image. When the user taps a button 302, the reproduction mode control unit 208 identifies that the free operation mode is selected by the user and sets the reproduction mode to the free operation mode. When the user taps buttons 303 to 305 each having a different player name, the reproduction mode control unit 208 identifies that the player's viewpoint mode is selected by the user and sets the reproduction mode to the player's viewpoint mode. Then, the reproduction mode control unit 208 outputs the player identification information associated with the tapped button. The player identification information refers to, for example, an identifier (ID) for identifying each individual player. Although, in the following descriptions, the names of players to be displayed are predetermined, the number of displayed buttons and the names of players to be displayed may change during the reproduction of a virtual viewpoint image, for example, by displaying the names of players captured by the virtual camera.

The reproduction mode control unit 208 may change the reproduction mode in response to a double tap operation. When a player is displayed on the double tapped coordinates, the reproduction mode control unit 208 sets the player's viewpoint mode and outputs the player identification information for the player. If no player is present on the double tapped coordinates, the reproduction mode control unit 208 sets the reproduction mode to the free operation mode. The determination whether a player is present on the double tapped coordinates is performed according to whether the distance between the coordinates of the tapped point and the coordinates of the player's position acquired from the HDD 105 or the external server 111 is shorter than a predetermined distance. When a user operation other than a double tap operation is performed, the reproduction mode control unit 208 outputs the same reproduction mode and player identification information as those in the previous frame, without changing the reproduction mode and the player identification information.

Candidates of the reproduction mode to be selected are not limited to the free operation mode and the player's viewpoint mode according to the present exemplary embodiment. For example, the reproduction mode control unit 208 may identify one reproduction mode selected from three or more modes by a user operation. In addition, the reproduction mode may be automatically selected based on the reproduction environment of the user and the details of the content. The reproduction mode control unit 208 may also identify the set reproduction mode by acquiring information about a currently set reproduction mode from an apparatus different from the control apparatus 100.

In step S703, the acquisition data control unit 202 sets the reproduction state according to the acquired operation information. When a tap operation is detected in an area including no button in the display screen, if the current reproduction state of the virtual viewpoint image on the display unit 207 is the paused state, the acquisition data control unit 202 changes the reproduction state to the reproducing state. Meanwhile, when the current reproduction state of the virtual viewpoint image is the reproducing state when a tap operation is detected, the acquisition data control unit 202 changes the reproduction state of the virtual viewpoint image to the paused state. The acquisition data control unit 202 changes the reproduction state of the virtual viewpoint image in response to a tap operation on the display screen, enabling the user to change the reproduction state by an intuitive operation.

In step S704, the viewpoint control unit 205 determines whether to perform a viewpoint operation in the free viewpoint operation mode or a viewpoint operation in the player's viewpoint mode according to the reproduction mode set by reproduction mode control unit 208. In the free operation mode (FREE OPERATION MODE in step S704), the processing proceeds to step S705. In step S705, the viewpoint control unit 205 outputs camera parameters as viewpoint information about the position and the orientation of the virtual camera to a drawing unit 206 based on the operation information corresponding to a user operation on the operation unit 201. The processing in step S705 will be described in detail below with reference to FIG. 8.

In the player's viewpoint mode (PLAYER'S VIEWPOINT MODE in step S704), the processing proceeds to step S706. In step S706, the camera path acquisition unit 204 acquires from the HDD 105 or the external server 111 the camera path corresponding to the player identification information acquired from the reproduction mode control unit 208, and outputs the camera parameters for one frame to the viewpoint control unit 205. More specifically, the camera parameters corresponding to the player selected by a user operation from the plurality of players displayed in the buttons 303 to 305 illustrated in FIG. 3 are output to the viewpoint control unit 205. When the virtual viewpoint image is being reproduced as a moving image, the camera path acquisition unit 204 outputs the camera parameters of the next frame. Meanwhile, when the reproduction of the virtual viewpoint image is being paused, the camera path acquisition unit 204 outputs the camera parameters of the paused frame. When the camera parameters have already been output in the pause state, the camera path acquisition unit 204 does not need to output the camera parameters again. The camera parameters output by the camera path acquisition unit 204 refers to viewpoint information representing the position and the orientation of the virtual camera corresponding to the position and the orientation of the player, respectively, and includes a position Tc and an orientation Rc of the player's face.

In step S707, the viewpoint control unit 205 determines offset information based on the operation information corresponding to a user operation on the operation unit 201. The viewpoint control unit 205 outputs adjusted parameters to the drawing unit 206. The adjusted parameters are the camera parameters acquired from the camera path acquisition unit 204 and then adjusted based on the offset information. The processing in step S707 will be described below with reference to FIG. 9.

In step S708, the data acquisition unit 203 acquires material data (polygon data and texture data of the object generated based on a plurality of viewpoint images and captured images) to be used in the rendering of the virtual viewpoint image from the HDD 105 or the external server 111, and outputs the material data to the drawing unit 206. The material data used in the rendering of the virtual viewpoint image does not differ according to whether the reproduction mode determined in step S704 is the free operation mode or the player's viewpoint mode. When the virtual viewpoint image is being reproduced as a moving image, the data acquisition unit 203 outputs the material data to be used in rendering of the next image frame. Meanwhile, when the reproduction of the virtual viewpoint image is being paused, the data acquisition unit 203 outputs the material data to be used in rendering of the paused image frame. When the material data have already been output in the paused state, the data acquisition unit 203 does not output the material data again.

In step S709, the drawing unit 206 performs rendering based on the material data acquired from the data acquisition unit 203 and the camera parameters acquired from the viewpoint control unit 205 to generate a virtual viewpoint image corresponding to the position and the orientation of the virtual viewpoint controlled according to the reproduction mode. Examples of applicable rendering methods include image-based rendering and model-based rendering.

The camera parameters that are used for the rendering can be classified into two categories: external parameters and internal parameters of the virtual camera. The external parameters of the virtual camera represent the position and the orientation of the virtual camera. The internal parameters of the virtual camera represent the optical characteristics of the virtual camera. The external and internal parameters will be more specifically described below. When a vector t represents the position of the virtual camera and a rotation matrix R represents the orientation of the virtual camera, the external parameters of the virtual camera can be represented by the following formula:

$$\begin{bmatrix} R & t \\ 0 & 1 \end{bmatrix}. \quad (1)$$

When the virtual camera has a principal point position ($c_x$,$c_y$) and a focal length f, an internal parameter K of the virtual camera can be represented by the following formula:

$$K = \begin{bmatrix} f & 0 & c_x \\ 0 & f & c_y \\ 0 & 0 & 1 \end{bmatrix}. \quad (2)$$

The camera parameters may be represented by other than a matrix. For example, the position of the virtual camera may be represented by three-dimensional coordinates, and the orientation of the virtual camera may be represented by the enumeration of values of yaw, roll, and pitch. The external and internal parameters are not limited the above described parameters. For example, the internal parameters of the virtual camera may include information indicating the zoom value of the virtual camera. As described above, there are variations in the parameters of the virtual camera to be used for the generation of a virtual viewpoint image.

In step S710, the drawing unit 206 outputs a generated virtual viewpoint image to the display unit 207 and performs display control to display the virtual viewpoint image on the display unit 207. The display unit 207 displays the virtual viewpoint image acquired from the drawing unit 206. With the above described processing procedure, the control apparatus 100 according to the present exemplary embodiment performs processing.

<Virtual Camera Control in Free Operation Mode>

Figure 8:
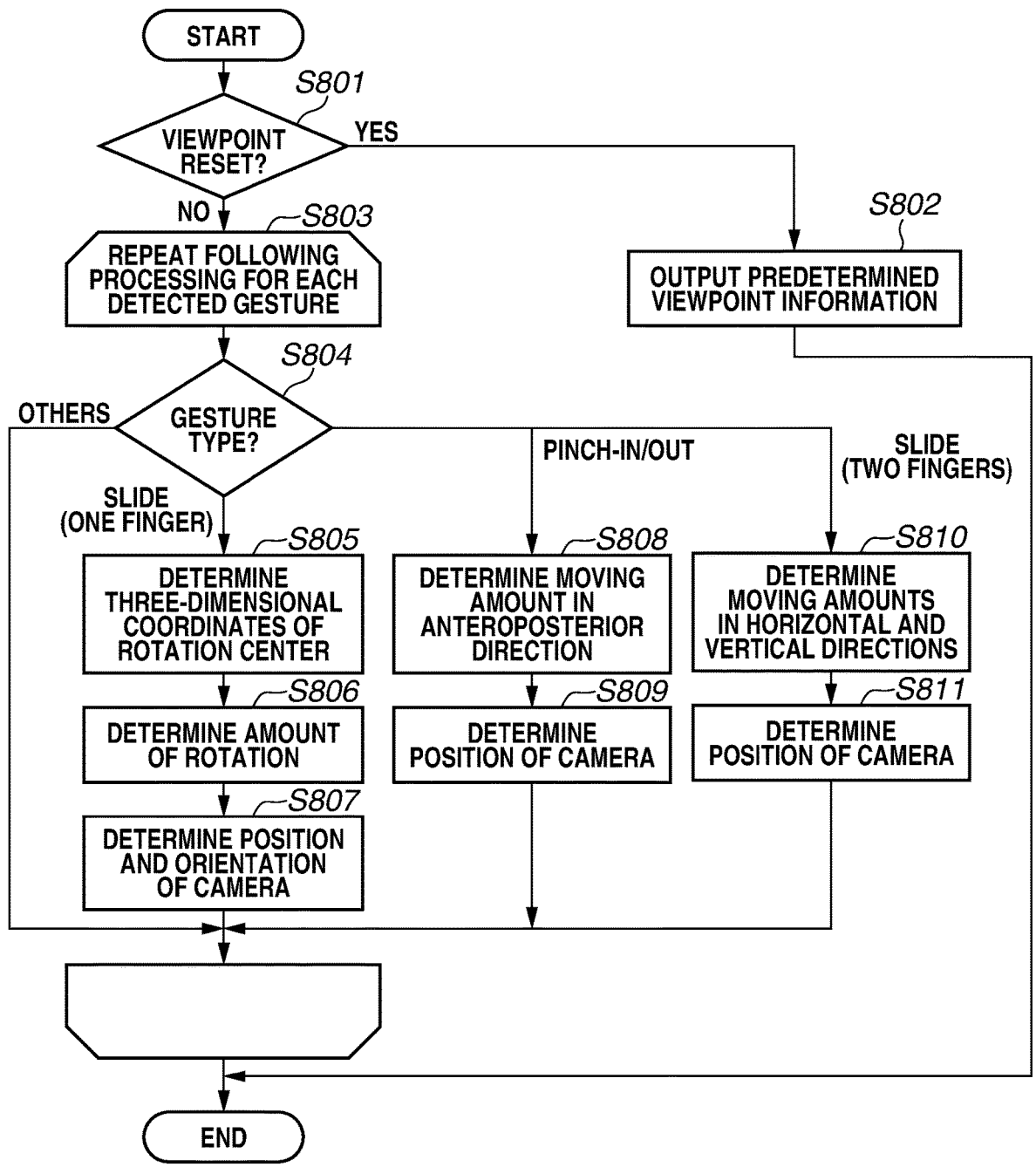
FIG. 8 is a flowchart illustrating an example of processing related to virtual viewpoint control in the free operation mode.

The processing in step S705 illustrated in FIG. 7 will be described below with reference to FIG. 8. In step S705, the viewpoint control unit 205 acquires the operation information corresponding to a user operation to the operation unit 201 and outputs the camera parameters of the virtual camera used to draw a virtual viewpoint image to the drawing unit 206.

In step S801, the viewpoint control unit 205 determines whether to perform the viewpoint reset in response to a user operation on the operation unit 201. According to the present exemplary embodiment, when the user taps a specific area (for example, the area where a viewpoint reset button 301 illustrated in FIG. 3 is displayed) on the display screen, the viewpoint control unit 205 determines to perform the viewpoint reset.

When the viewpoint control unit 205 determines to perform the viewpoint reset (YES in step S801), the processing proceeds to step S802. In step S802, the viewpoint control unit 205 resets the position and the orientation of the virtual camera. More specifically, upon detection of a user operation on a predetermined position on the display screen, the viewpoint control unit 205 changes the position and the orientation of the virtual viewpoint to predetermined position and orientation. Then, the viewpoint control unit 205 outputs the camera parameters of the virtual camera after the reset to the drawing unit 206. According to the present exemplary embodiment, the position of the virtual camera after the reset is the position represented by coordinates [0 0 0], and the orientation of the virtual camera is an orientation represented by a unit matrix. However, the viewpoint information indicating the position and the orientation of the virtual camera after the reset is not limited thereto. For example, as viewpoint information after the reset, the viewpoint control unit 205 may use values preset by the user or may read recommended viewpoint information embedded in image data.

In step S803, the viewpoint control unit 205 acquires the operation information corresponding to each gesture detected by the operation unit 201. The viewpoint control unit 205 repeats processing in steps S804 to S811 for all of detected gestures. In step S804, the viewpoint control unit 205 determines the details of the virtual camera control based on the gesture type indicated by the acquired operation information. More diverse virtual camera control can be achieved by differentiating the details of the virtual camera control according to the gesture type.

When the gesture is a one-finger slide operation, the viewpoint control unit 205 rotates the virtual camera centering on the above-described three-dimensional point by processing in steps S805 to S807. The three-dimensional point refers to a point where a ray virtually emitted from a start point having the three-dimensional coordinates corresponding to the position of the virtual camera (e.g., center coordinates of the virtual camera) in the image-capturing direction of the virtual camera (ray cast) reaches the subject. In other words, the three-dimensional point refers to a point having coordinates on the three-dimensional space corresponding to the center position of the virtual viewpoint image displayed at the time of a touch operation. However, the three-dimensional point is not limited to thereto.

When the gesture is a pinch-in and/or a pinch-out operation, the viewpoint control unit 205 controls the movement of the virtual camera in the anteroposterior direction by processing in steps S808 and S809. When the gesture is a two-finger slide operation, the viewpoint control unit 205 controls the translation of the virtual camera in response to the slide operation by processing in steps S810 and S811. When the gesture is not the above-described three types, the viewpoint control unit 205 outputs the camera parameters to the drawing unit 206 without changing the current position and orientation of the virtual camera. Details of control according to each gesture will be described below.

In step S805, in response to a one-finger slide operation, the viewpoint control unit 205 determines the coordinates of the three-dimensional point as the center of the rotation of the virtual camera. The three-dimensional point is represented by a vector T. Once a three-dimensional point has been determined, the viewpoint control unit 205 does not change the three-dimensional point while the slide operation is being continued.

In step S806, the viewpoint control unit 205 acquires an amount of movement d of the representative point of the finger in contact with the screen and determines the amount of rotation of the virtual camera. The viewpoint control unit 205 according to the present exemplary embodiment determines the amount of movement (an amount of rotation θ in the horizontal direction and an amount of rotation φ in the vertical direction) of the virtual camera by multiplying amounts of movement $d_x$ and $d_y$ of the representative point by a scale factor s. When the resolution of the display screen is a width w, and that the amount of rotation when a slide operation is performed from one end to the other of the display screen is 360 degrees, the scale factor s to be used to determine the amounts of rotation θ and φ (degrees) based on the amounts of movement $d_x$ and $d_y$ is represented by the following formula:

$$s = \frac{360}{w}. \quad (3)$$

The amount of rotation of the virtual camera can be represented by the following formulas including the scale factor s.

$$\theta = s * d_x$$

$$\varphi = s * d_y$$

In step S807, the viewpoint control unit 205 determines the position and the orientation of the virtual camera which changed according to the above-described amount of rotation and outputs the camera parameters representing the determined position and orientation to the drawing unit 206. When a position $t_{n-1}$ and an orientation $R_{n-1}$ of the virtual camera before the change are rotated by θ in the horizontal direction and then rotated by φ in the vertical direction centering on a three-dimensional point represented by a vector T, a position $t_n$ and an orientation $R_n$ of the virtual camera after the change can be represented by the following formulas:

$$R_n = R(\theta, \varphi) R_{n-1}$$

$$t_n = R(\theta, \varphi)(t_{n-1} - T) + T$$

A rotation matrix R(θ,φ) indicates the rotation by θ in the horizontal direction and φ in the vertical direction. However, the formula for calculating the position and the orientation of the virtual camera after the rotation centering on the three-dimensional point represented by the vector T is not limited thereto. For example, by using a predetermined coefficient, the amount of movement of the virtual camera with respect to the amount of movement of the finger can be increased or decreased.

In step S808, the viewpoint control unit 205 determines the amount of movement of the virtual camera in the anteroposterior direction in response to a pinch-in or a pinch-out operation of the user. When the distance between two fingers in contact with the screen displaying the current image frame is $d_n$, and denote the distance between two fingers in contact with the screen displaying the previous image frame is $d_{n-1}$, a variation Δd is represented by Δd=$d_n$−$d_{n-1}$. The viewpoint control unit 205 anteroposteriorly moves the virtual camera by an amount of movement proportional to the variation in the image-capturing direction. When a coefficient (sensitivity) related to the amount of movement is m, an amount of movement Δz of the virtual camera can be represented by Δz=m*Δd. More specifically, the amount of movement of the virtual camera is determined according to the amount of movement of the finger per unit time by a pinch-in and a pinch-out operation. The method for determining the amount of movement of the virtual camera is not limited to the above-described method. For example, the amount of movement of the virtual camera on the three-dimensional space corresponding to the amount of movement of the finger on the display screen may be determined based on the distance from the virtual camera to the three-dimensional point represented by the vector T.

In step S809, the viewpoint control unit 205 determines the position and the orientation of the virtual camera which has been changed according to the above-described amount of movement and outputs the camera parameters representing the determined position and orientation to the drawing unit 206. The position of the virtual camera after the change (movement) by Δz in the anteroposterior direction is represented by the following formula:

$$R_n = R_{n-1} \quad (4)$$

$$t_n = t_{n-1} + R_n \begin{bmatrix} 0 \\ 0 \\ \Delta z \end{bmatrix}.$$

When a pinch-in and a pinch-out operation is performed, the viewpoint control unit 205 may change the zoom value or the viewing angle of the virtual camera instead of moving the position of the virtual camera in the anteroposterior direction.

In step S810, the viewpoint control unit 205 controls the movement of the virtual camera in the horizontal and vertical directions in response to a two-finger slide operation. According to the present exemplary embodiment, the amount of movement is determined so that the three-dimensional point T moves on the display screen by the distance that equals the amount of movement of the fingers on the display screen. More specifically, when the user touches the display position of a certain object (e.g., a footballer) with two fingers and slides the two fingers on the display screen, the position of the virtual camera changes while the positional relation between the display position of the object and the two fingers remains unchanged. When the distance from the virtual camera to the three-dimensional point at the time of a touch operation is r, an amount of movement Δx in the horizontal direction and an amount of movement Δy in the vertical direction with respect to the orientation of the virtual camera can be represented by the following formula:

$$u = \frac{r}{\sqrt{(x'_x - cx)^2 + (x'_y - cx)^2 + f^2}} \quad (5)$$

$$\Delta x = u \times d_x$$

$$\Delta y = u \times d_y.$$

In step S811, the viewpoint control unit 205 determines the position and the orientation of the virtual camera which changed according to the above-described amounts of movement and outputs the camera parameters representing the determined position and orientation to the drawing unit 206. The position and the orientation of the virtual camera after the movement by Δx in the horizontal direction and Δy in the vertical direction are represented by the following formula:

$$R_n = R_{n-1} \quad (6)$$

$$t_n = t_{n-1} + R_n \begin{bmatrix} \Delta x \\ \Delta y \\ 0 \end{bmatrix}.$$

The correspondence between the gesture type and the processing is not limited to the above-described example. The control apparatus 100 may enable or disable the processing corresponding to each gesture according to a setting preset by the user.

<Virtual Camera Control in Player's Viewpoint Mode>

The processing in step S707 illustrated in FIG. 7 will be described below with reference to FIG. 9. In step S707, the viewpoint control unit 205 acquires the operation information corresponding to a user operation on the operation unit 201 and acquires the camera parameters indicating a position Tcn and an orientation Rcn of the virtual camera corresponding to the player's viewpoint from the camera path acquisition unit 204. Then, the viewpoint control unit 205 calculates offsets for the acquired camera parameters based on the operation information and outputs the camera parameters, to which the calculated offsets added, to the drawing unit 206 as the camera parameters of the virtual camera used to draw a virtual viewpoint image. The offset related to the orientation of the virtual camera is represented by an amount of rotation $\theta_n$ in the horizontal direction and an amount of rotation $\varphi_n$ in the vertical direction.

In step S901, the viewpoint control unit 205 determines whether to perform the viewpoint reset in response to a user operation on the operation unit 201. According to the present exemplary embodiment, the viewpoint control unit 205 determines to perform the viewpoint reset when a specific area (for example, the area where the viewpoint reset button 301 illustrated in FIG. 3 is displayed) on the display screen is tapped. The position and the orientation of the virtual camera after the reset coincide with the position and the orientation of the selected player's face, respectively. The viewpoint reset may also be performed when the reproduction state of the moving image of the virtual viewpoint image is changed from the paused state to the reproducing state. When the offset information for the virtual viewpoint is reset at the time of reproduction, the change of the orientation of the virtual viewpoint made in the paused state is reset, whereby the image reproduction corresponding to the player's viewpoint can be simply restarted.

When the viewpoint control unit 205 determines to perform the viewpoint reset (YES in step S901), the processing proceeds to step S902. In step S902, the viewpoint control unit 205 resets the offset of the orientation and the change of the viewing angle of the virtual camera. More specifically, upon detection of a user operation on a predetermined position on the display screen, the viewpoint control unit 205 changes the position and the orientation of the virtual viewpoint to coincide with the position and the orientation of a reference object (e.g., a player), respectively. More specifically, the viewpoint control unit 205 sets the amounts of rotation $\theta_n$ and $\varphi_n$ representing the offset of the orientation with respect to the camera path to zero. Meanwhile, the viewpoint control unit 205 changes a viewing angle f to a predetermined value. When viewing angle information is embedded in the camera path, the viewing angle f of the virtual viewpoint may be set to the value of the viewing angle information.

In step S903, the viewpoint control unit 205 acquires the operation information corresponding to each of gestures detected by the operation unit 201. The viewpoint control unit 205 repeats processing in steps S904 to S908 for all of detected gestures.

In step S904, the viewpoint control unit 205 determines the details of the virtual camera control based on the gesture type indicated by the acquired operation information. More diverse virtual camera control can be achieved by differentiating the details of the virtual camera control according to the gesture type.

When the gesture is a slide operation, the viewpoint control unit 205 changes the orientation of the virtual camera without changing the camera position by processing in steps S905 to S907. When the gesture is a pinch-in and/or a pinch-out operation, the viewpoint control unit 205 controls the viewing angle of the virtual camera by processing in step S908.

When the gesture is other than the above-described two types of gestures, the viewpoint control unit 205 outputs information representing the offset of the orientation of the virtual camera determined according to previous operations (amounts of rotation $\theta_n$ and $\varphi_n$) to the drawing unit 206. Details of control according to each gesture will be described below.

In step S905, the viewpoint control unit 205 determines whether to change the offset of the orientation of the virtual camera based on the reproduction state of the virtual viewpoint image set by the reproduction mode control unit 208. When the reproduction state is the paused state, the processing proceeds to step S906. Meanwhile, when the reproduction state is not the paused state, the processing returns to step S903 without changing the offset.

In step S906, the viewpoint control unit 205 acquires the amount of movement d of the representative point of the finger in contact with the screen and determines the amount of rotation related to the offset of the orientation of the virtual camera. The viewpoint control unit 205 according to the present exemplary embodiment determines the amounts of rotation (the amount of rotation $\Delta\theta$ in the horizontal direction and the amount of rotation $\Delta\varphi$ in the vertical direction) of the virtual camera by multiplying the amounts of movement $d_x$ and $d_y$ of the representative point by a scale factor $s_o$ by the processing in step S806. The amounts of rotation may be determined so that the three-dimensional point moves on the display screen by a distance that equals the amount of movement of the finger on the display screen. More specifically, when the user touches the display position of an object and then slides the finger from the touch position on the display screen, the virtual camera may rotate so that the positional relation between the display position of the object and the finger remains unchanged. The amount of rotation may be calculated based on the distance between the selected object and the position of the virtual camera, and the viewing angle of the virtual camera. For example, the longer the distance between the selected object and the position of the virtual camera, the smaller the amount of rotation is made. The smaller the viewing angle, the smaller the amount of rotation is made. An object may be selected with a touch operation, or a preset target object such as a ball may be selected.

In step S907, the viewpoint control unit 205 calculates a new offset based on the amount of rotation and the offset set in the previous frame. When the offset in the previous frame is further rotated by $\Delta\theta$ in the horizontal direction and $\Delta\varphi$ in the vertical direction, the offset after the change can be represented by the following formulas, where $\theta_n$ is the amount of rotation in the horizontal direction and $\varphi_n$ is the amount of rotation in the vertical direction.

$$\theta_n = \theta_{n-1} + \Delta\theta$$

$$\varphi_n = \varphi_{n-1} + \Delta\varphi$$

In step S908, the viewpoint control unit 205 determines the viewing angle of the virtual camera according to a pinch-in or a pinch-out operation by the user and outputs the determined viewing angle to the drawing unit 206. When the distance between the two fingers in contact with the screen displaying the current image frame is $d_n$, and the distance between the two fingers in contact with the screen displaying the previous image frame is $d_{n-1}$, the variation $\Delta d$ is represented by $\Delta d = d_n - d_{n-1}$. The viewpoint control unit 205 changes the viewing angle of the virtual camera by a variation proportional to the variation $\Delta d$. When a coefficient (sensitivity) related to the variation of the viewing angle is p, a variation $\Delta f$ of the viewing angle of the virtual camera can be represented in $\Delta f = p * \Delta d$. More specifically, the variation of the viewing angle of the virtual camera is determined according to the amount of movement of the finger per unit time by a pinch-in and a pinch-out operation. Then, the viewpoint control unit 205 adds the calculated variation $\Delta f$ to the current viewing angle f and outputs the result as a new viewing angle. The method for determining the variation of the viewing angle is not limited to the above-described method. For example, the variation of the viewing angle according to the amount of movement of the finger on the display screen may be determined based on the distance from the virtual camera to the three-dimensional point represented by the vector T. When a pinch-in and a pinch-out operation are performed, the viewpoint control unit 205 may change the offset of the position of the virtual camera in the anteroposterior direction instead of changing the viewing angle of the virtual camera.

In step S909, the viewpoint control unit 205 adds the offset determined according to a user operation to the reference camera path acquired from the camera path acquisition unit 204 (the camera path according to the position and the orientation of a specific player) to calculate the position and the orientation of the virtual camera with the offset applied thereto. Then, the viewpoint control unit 205 outputs the resultant camera parameters after the offset application to the drawing unit 206. The offset addition is performed by rotating an orientation vector represented by an orientation Rcn of the virtual camera corresponding to the reference camera path by $\theta_n$ in the horizontal direction and $\varphi_n$ in the vertical direction, and then converting the result into a rotation matrix. In this process, the reference camera path for the offset application may be a camera path in which the position and the orientation of the virtual camera have undergone smoothing processing in the time axis direction. The smoothing processing reduces image blurring due to a vertical vibration when the player as a reference virtual viewpoint is running, whereby a viewer can comfortably view the virtual viewpoint image. However, while a moving image is being paused, the offset may be applied to the camera path not subjected to the smoothing processing since blurring does not occur. With this configuration, an image which can be comfortably viewed can be displayed in the moving image reproduction and an image in which the player's view is more accurately reproduced during the paused state can be displayed.

The correspondence between the gesture type and the processing is not limited to the above-described example. In addition, the control apparatus 100 may enable or disable the processing corresponding to each gesture according to a setting preset by the user. In the above-described example, the offsets of the virtual camera are changed in response to a user operation when the reproduction state of the moving image of the virtual viewpoint image is the paused state, and the offsets remain unchanged when the reproduction state is the reproducing state. However, the present invention is not limited thereto. Even in the reproducing state, the offsets may be changed as in the paused state. In the reproducing state, the offsets corresponding to a slide operation are applied while the user's finger is in contact with the display screen, and the offsets may be reset upon detachment of the user's finger from the display screen.

As described above, in response to a user operation, the control apparatus 100 according to the present exemplary embodiment controls at least either one of the position and the orientation of the virtual viewpoint related to the generation of a virtual viewpoint image. The control apparatus 100 changes the details of the virtual viewpoint control corresponding to a user operation according to the reproduction mode of the virtual viewpoint image. The above-described configuration enables the user to perform virtual viewpoint control in simpler and more diverse ways than in the conventional configuration. For example, the details of the virtual viewpoint control demanded by the user differ between a reproduction mode (e.g., the free operation mode) in which the virtual viewpoint remains unchanged while no user operation is performed and a reproduction mode (e.g., the player's viewpoint mode) in which the virtual viewpoint changes even while no user operation is performed. In this case, virtual viewpoint control suitable for each mode is performed by a user operation of the same type (at least either one of the position and the orientation of the virtual viewpoint is changed). Accordingly, the user does not have to manage various complicated operations, and therefore can easily perform virtual viewpoint setting.

In the player's viewpoint mode, the control apparatus 100 acquires a predetermined camera path as information indicating the change over time of the position and the orientation of the virtual viewpoint and, in response to a user operation, sets the adjustment amounts (offsets) for the position and the orientation of the virtual viewpoint with reference to the predetermined camera path. Then, the control apparatus 100 displays a virtual viewpoint image corresponding to the position and the orientation of the virtual viewpoint determined based on the predetermined camera path and the set offsets. The above-described configuration enables adjusting the position and the orientation of a virtual viewpoint in response to a user operation while maintaining part of features of the virtual viewpoint represented by a predetermined camera path. For example, by using a camera path representing the viewpoint of a specific player as a predetermined camera path, a virtual viewpoint image reproducing the view of the player can be displayed. In addition, by applying the offsets according to a user operation to the camera path corresponding to the player, a user watching the virtual viewpoint image can easily check an object that has not been seen by the player (an object that might have been seen by the player if the player saw another direction).

Although the present exemplary embodiment has been described above centering on a case where a user operation is performed via a touch panel, the user operation method is not limited thereto. The control apparatus 100 may acquire a gesture of the mouse as a user operation. According to the exemplary embodiment, for example, a tap operation may be assigned to a click on the left mouse button, a double tap operation may be assigned to a double-click on the left mouse button, and a one-finger slide operation may be assigned to a slide operation with the left mouse button. A two-finger slide operation may be assigned to a slide operation with the right mouse button, and a pinch-in and a pinch-out operation may be assigned to mouse wheel operations. The control apparatus 100 may perform the virtual viewpoint control by a user operation via other controllers such as a joystick.

The above-described exemplary embodiment makes it easier to set a virtual viewpoint related to a virtual viewpoint image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-007940, filed Jan. 21, 2019, which is hereby incorporated by reference herein in its entirety.

What is claimed is:

1. A control apparatus comprising:
one or more processors functioning by executing instructions stored in one or more memories as the following units:
a display control unit configured to display a virtual viewpoint image on a display unit, the virtual viewpoint image being generated based on a plurality of images acquired by capturing images of an image-capturing region from different directions by using a plurality of imaging apparatuses;
a specification unit configured to specify a selected reproduction mode from among a plurality of reproduction modes including a first reproduction mode in which a position of a virtual viewpoint corresponding to the virtual viewpoint image displayed on the display unit is determined regardless of a position of an object in the image-capturing region, and a second reproduction mode in which the position of the virtual viewpoint changes in accordance with the position of the object in the image-capturing region; and
a control unit configured to change at least either one of a position of the virtual viewpoint and an orientation of view from the virtual viewpoint in response to a user operation,
wherein the change to be made in response to the same user operation differs between a case where the reproduction mode specified by the specification unit is the first reproduction mode and a case where the specified reproduction mode is the second reproduction mode.

2. The control apparatus according to claim 1,
wherein, in the first reproduction mode, the orientation of the virtual viewpoint is determined regardless of the orientation of the object in the image-capturing region, and
wherein, in the second reproduction mode, the orientation of the virtual viewpoint changes in accordance with the orientation of the object in the image-capturing region.

3. The control apparatus according to claim 1, wherein at least either one of the position and the orientation of the virtual viewpoint is changed in response to a user operation for touching the display unit.

4. The control apparatus according to claim 1,
wherein, in a case where the specified reproduction mode is the first reproduction mode, the position of the virtual viewpoint and the orientation of view from the virtual viewpoint are changed in response to the user operation, and
wherein, in a case where the specified reproduction mode is the second reproduction mode, the orientation of view from the virtual viewpoint is changed and the position of the virtual viewpoint remains unchanged in response to the same user slide operation.

5. The control apparatus according to claim 4, wherein, when the specified reproduction mode is the first reproduction mode, the virtual viewpoint rotates while being oriented to a specific reference position in response to the user operation.

6. The control apparatus according to claim 3,
wherein, when the specified reproduction mode is the first reproduction mode, the position of the virtual viewpoint is changed in response to a pinch-in operation for bringing two touch positions closer to each other or a pinch-out operation for bringing two touch positions away from each other performed on the display unit, and
wherein, when the specified reproduction mode is the second reproduction mode, a viewing angle corresponding to the virtual viewpoint is changed in response to the pinch-in or the pinch-out operation performed on the display unit.

7. The control apparatus according to claim 1, wherein, in the first reproduction mode, the position and the orientation of the virtual viewpoint remain unchanged while no user operation is performed.

8. The control apparatus according to claim 1, wherein, in the second reproduction mode, the virtual viewpoint moves through a position separated from a moving path of the object in the image-capturing region, by an adjustment amount determined in accordance with the user operation.

9. The control apparatus according to claim 1, wherein the object is a person selected from among a plurality of persons by a user.

10. The control apparatus according to claim 1, wherein, in the second reproduction mode, the orientation of the virtual viewpoint is deviated from the orientation of the object in the image-capturing region, by an adjustment amount determined in accordance with the user operation.

11. The control apparatus according to claim 1, wherein, in the second reproduction mode, a change to be made in response to the same user operation, differs between a case where a moving image of the virtual viewpoint image is being reproduced and a case where the moving image is being paused.

12. The control apparatus according to claim 1, wherein, the plurality of images used to generate the virtual viewpoint image to be displayed on the display unit does not differ between a case where the specified reproduction mode is the first reproduction mode and a case where the specified reproduction mode is the second reproduction mode.

13. A control method comprising:
displaying a virtual viewpoint image on a display unit, the virtual viewpoint image being generated based on a plurality of images acquired by capturing images of an image-capturing region from different directions by using a plurality of imaging apparatuses;
specifying a selected reproduction mode from among a plurality of reproduction modes including a first reproduction mode in which a position of a virtual viewpoint corresponding to the virtual viewpoint image displayed on the display unit is determined regardless of a position of an object in the image-capturing region, and a second reproduction mode in which the position of the virtual viewpoint changes in accordance with the position of the object in the image-capturing region; and
changing at least either one of a position of the virtual viewpoint and an orientation of view from the virtual viewpoint in response to a user operation,
wherein the change to be made in response to the same user operation differs between a case where the specified reproduction mode is the first reproduction mode and a case where the specified reproduction mode is the second reproduction mode.

14. The control method according to claim 13,
wherein, in the first reproduction mode, the orientation of the virtual viewpoint is determined regardless of the orientation of the object in the image-capturing region, and
wherein, in the second reproduction mode, the orientation of the virtual viewpoint changes in accordance with the orientation of the object in the image-capturing region.

15. The control method according to claim 13, wherein, in the second reproduction mode, the virtual viewpoint moves through a position separated from a moving path of a specific object in the image-capturing region, by an adjustment amount determined in accordance with the user operation.

16. A non-transitory computer-readable storage medium storing a program for causing a computer to execute a control method comprising:
displaying a virtual viewpoint image on a display unit, the virtual viewpoint image being generated based on a plurality of images acquired by capturing images of an image-capturing region from different directions by using a plurality of imaging apparatuses;
specifying a selected reproduction mode from among a plurality of reproduction modes including a first reproduction mode in which a position of a virtual viewpoint corresponding to the virtual viewpoint image displayed on the display unit is determined regardless of a position of an object in the image-capturing region, and a second reproduction mode in which the position of the virtual viewpoint changes in accordance with the position of the object in the image-capturing region; and
changing at least either one of a position of the virtual viewpoint and an orientation of view from the virtual viewpoint in response to a user operation,
wherein the change to be made in response to the same user operation differs between a case where the specified reproduction mode is the first reproduction mode and a case where the specified reproduction mode is the second reproduction mode.

* * * * *